(12) United States Patent
Nammi et al.

(10) Patent No.: US 11,425,590 B2
(45) Date of Patent: *Aug. 23, 2022

(54) FACILITATION OF MULTIPLE INPUT MULTIPLE OUTPUT COMMUNICATION FOR 5G OR OTHER NEXT GENERATION NETWORK

(71) Applicant: AT&T Intellectual Property I, L.P., Atlanta, GA (US)

(72) Inventors: SaiRamesh Nammi, Kista (SE); Arunabha Ghosh, Austin, TX (US)

(73) Assignee: AT&T INTETLLECTUAL PROPERTY I, L.P., Atlanta, GA (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/104,577

(22) Filed: Nov. 25, 2020

(65) Prior Publication Data

US 2021/0084519 A1 Mar. 18, 2021

Related U.S. Application Data

(63) Continuation of application No. 16/578,834, filed on Sep. 23, 2019, now Pat. No. 10,887,784, which is a
(Continued)

(51) Int. Cl.
*H04W 24/00* (2009.01)
*H04W 28/02* (2009.01)
(Continued)

(52) U.S. Cl.
CPC ...... *H04W 28/0205* (2013.01); *H04B 7/0417* (2013.01); *H04B 7/0486* (2013.01);
(Continued)

(58) Field of Classification Search
None
See application file for complete search history.

(56) References Cited

U.S. PATENT DOCUMENTS 8,311,142 B2 11/2012 Gao et al.
8,537,924 B2 9/2013 Jöngren et al.
(Continued)

FOREIGN PATENT DOCUMENTS

CN 101405966 A 4/2009
CN 101640561 A 2/2010
(Continued)

OTHER PUBLICATIONS

Frenger, "MIMO in LTE and LTE-Advaneed", Ericsson Research, Oct. 5, 2009, 33 pages.
(Continued)

*Primary Examiner* — Sithu Ko
(74) *Attorney, Agent, or Firm* — Amin, Turocy & Watson, LLP

(57) ABSTRACT

Doppler metric data relating to a speed of a mobile device can be used by the mobile device to determine whether a speed threshold has been satisfied. If the speed threshold has been satisfied, then the mobile device can make a recommendation to a network node device to terminate closed-loop multiple input multiple output transmissions and to use a rank-1 precoder transmission. The network device can then decide how to proceed. Alternatively, the network device can change the transmission type based on a load threshold being determined to have been satisfied and the recommendation from the mobile device.

20 Claims, 15 Drawing Sheets

Related U.S. Application Data continuation of application No. 15/624,407, filed on Jun. 15, 2017, now Pat. No. 10,470,072.

(51) Int. Cl.
| | |
|---|---|
| *H04B 7/0456* | (2017.01) |
| *H04B 7/0417* | (2017.01) |
| *H04L 25/02* | (2006.01) |
| *H04L 5/00* | (2006.01) |
| *H04B 7/06* | (2006.01) |

(52) U.S. Cl.
CPC ............ *H04B 7/063* (2013.01); *H04B 7/0626* (2013.01); *H04L 5/0057* (2013.01); *H04L 25/0204* (2013.01); *H04L 5/0023* (2013.01)

(56) References Cited

U.S. PATENT DOCUMENTS

| | | | |
|---|---|---|---|
| 8,638,885 | B2 | 1/2014 | Evseev et al. |
| 8,649,326 | B2 | 2/2014 | Wu |
| 8,755,810 | B2 | 6/2014 | Tan et al. |
| 8,908,747 | B2 | 12/2014 | Nammi |
| 9,008,714 | B2 | 4/2015 | Tokgoz et al. |
| 9,048,903 | B2 | 6/2015 | Pan et al. |
| 9,107,087 | B2 | 8/2015 | Li et al. |
| 9,124,532 | B2 | 9/2015 | Chen et al. |
| 9,178,590 | B2 | 11/2015 | Kuo et al. |
| 9,252,930 | B2 | 2/2016 | Qu et al. |
| 9,294,170 | B2 | 3/2016 | Chen et al. |
| 9,401,748 | B2 | 7/2016 | Chen et al. |
| 9,414,371 | B2 | 8/2016 | Pi et al. |
| 9,425,873 | B2 | 8/2016 | Jöngren |
| 9,509,383 | B2 | 11/2016 | Kim et al. |
| 9,516,655 | B2 | 12/2016 | Liu et al. |
| 9,553,646 | B1 | 1/2017 | Zhou |
| 9,762,456 | B2 | 9/2017 | Mismar et al. |
| 9,882,617 | B2* | 1/2018 | Nammi ............... H01Q 21/00 |
| 9,954,598 | B2 | 4/2018 | Astrom et al. |
| 9,999,073 | B2* | 6/2018 | Nammi ............... H04B 7/0684 |
| 10,396,925 | B2* | 8/2019 | Wu ....................... H04J 11/0053 |
| 10,462,801 | B2 | 10/2019 | Nammi et al. |
| 10,708,796 | B2* | 7/2020 | Sun ....................... H04B 7/0413 |
| 10,986,645 | B2 | 4/2021 | Nammi et al. |
| 2009/0086648 | A1 | 4/2009 | Xu et al. |
| 2010/0091905 | A1 | 4/2010 | Khan |
| 2010/0246697 | A1 | 9/2010 | Teng et al. |
| 2010/0284484 | A1 | 11/2010 | Jöngren et al. |
| 2011/0111781 | A1 | 5/2011 | Chen et al. |
| 2011/0243100 | A1 | 10/2011 | Ball et al. |
| 2011/0244905 | A1 | 10/2011 | Burström et al. |
| 2011/0255483 | A1 | 10/2011 | Xu et al. |
| 2012/0057538 | A1 | 3/2012 | Adhikari et al. |
| 2012/0087401 | A1 | 4/2012 | Bhattad et al. |
| 2012/0314588 | A1 | 12/2012 | Nammi |
| 2012/0320841 | A1 | 12/2012 | Miki et al. |
| 2013/0022142 | A1 | 1/2013 | Nammi |
| 2013/0095839 | A1 | 4/2013 | Venkatraman et al. |
| 2013/0315284 | A1 | 11/2013 | Nammi |
| 2014/0133317 | A1 | 5/2014 | Chen et al. |
| 2014/0192918 | A1 | 7/2014 | Park et al. |
| 2014/0376652 | A1 | 12/2014 | Sayana et al. |
| 2015/0009836 | A1 | 1/2015 | Tujkovic et al. |
| 2015/0207556 | A1 | 7/2015 | Nammi et al. |
| 2015/0304076 | A1 | 10/2015 | Lee et al. |
| 2015/0358062 | A1 | 12/2015 | Skillermark et al. |
| 2016/0006487 | A1 | 1/2016 | Ding et al. |
| 2016/0057753 | A1 | 2/2016 | Yang et al. |
| 2016/0080058 | A1 | 3/2016 | Kang et al. |
| 2016/0143055 | A1 | 5/2016 | Nammi et al. |
| 2016/0173244 | A1 | 6/2016 | Ding |
| 2016/0212750 | A1 | 7/2016 | Xu et al. |
| 2016/0302174 | A1 | 10/2016 | Chatterjee et al. |
| 2017/0019238 | A1 | 1/2017 | Sharma et al. |
| 2017/0111930 | A1 | 4/2017 | Rajagopal et al. |
| 2017/0134080 | A1 | 5/2017 | Rahman et al. |
| 2017/0134082 | A1 | 5/2017 | Onggosanusi et al. |
| 2017/0195029 | A1 | 7/2017 | Nammi et al. |
| 2018/0176828 | A1 | 6/2018 | Chen et al. |
| 2019/0036829 | A1* | 1/2019 | Ji ............................. H04B 7/01 |

FOREIGN PATENT DOCUMENTS

| | | | |
|---|---|---|---|
| CN | 101816203 | A | 8/2010 |
| CN | 102687413 | A | 9/2012 |
| CN | 103155504 | A | 6/2013 |
| CN | 104885393 | A | 9/2015 |
| JP | 2009-524298 | A | 6/2009 |
| JP | 2011-504308 | A | 2/2011 |
| JP | 2011-147069 | A | 7/2011 |
| JP | 2013-510541 | A | 3/2013 |
| KR | 10-2010-0080548 | A | 7/2010 |
| KR | 10-2013-0071494 | A | 6/2013 |
| WO | 2009/057559 | A1 | 5/2009 |
| WO | 2009/099151 | A1 | 8/2009 |
| WO | 2015/190956 | A1 | 12/2015 |
| WO | 2016/108740 | A1 | 7/2016 |
| WO | 2017/078842 | A1 | 5/2017 |
| WO | 2017/095471 | A1 | 6/2017 |

OTHER PUBLICATIONS

Lamare et al., "Adaptive reduced-rank equalitzation algorithms based on alternating optimization design techniquies for MIMO systems", IEEE Transactions on Vehicular Technology, Jul. 2011, vol. 60, No. 6, pp. 2482-2494.

Harris et al., "Performance Characterization of a Real-Time Massive MIMO System with LOS Mobile Channels", IEEE Journal on Selected Areas in Communications, 2017, vol. 35, No. 6, pp. 1-10.

Mogensen et al., "Centimeter-wave concept for 5G ultra-dense small cells", Vehicular Technology Conference (VTC Spring), 2014, IEEE, 7 pages.

Mahmood et al., "An Efficient Rank Adaptation Algorithm for Cellular MIMO Systems with IRC Receivers", Vehicular Technology Conference (VTC Spring), 2014, IEEE, 3 pages.

International Search Report and Written Opinion received for PCT Application Serial No. PCT/US2018/029479 dated Jul. 10, 2018, 21 pages.

Non-Final Office Action received for U.S. Appl. No. 15/588,100 dated Aug. 27, 2018, 45 pages.

International Search Report and Written Opinion received for PCT Application Serial No. PCT/US2018/029478 dated Jul. 17, 2018, 18 pages.

Non-Final Office Action received for U.S. Appl. No. 15/624,407 dated Jan. 18, 2019, 29 pages.

Notice of Allowance received for U.S. Appl. No. 15/624,407 dated Jun. 24, 2019, 34 pages.

International Preliminary Report on Patentability received for PCT Application Serial No. PCT/US2018/029479 dated Dec. 26, 2019, 14 pages.

International Preliminary Report on Patentability received for PCT Application Serial No. PCT/US2018/029478 dated Nov. 14, 2019, 12 pages.

Notice of Allowance received for U.S. Appl. No. 16/578,834 dated Sep. 24, 2020, 59 pages.

Non-Final Office Action received for U.S. Appl. No. 16/556,747 dated Aug. 20, 2020, 35 pages.

Communication pursuant to Article 94(3) EPC received for European Patent Application Serial No. 18724413.2 dated Nov. 12, 2020, 5 pages.

U.S. Appl. No. 16/578,834, filed Sep. 23, 2019 U.S. Pat. No. 10,470,072.

U.S. Appl. No. 15/624,407, filed Jun. 15, 2017.

Communication pursuant to Article 94(3) EPC received for European Patent Application Serial No. 18724413.2 dated Jun. 30, 2021, 7 pages.

First Office Action received for Chinese Patent Application Serial No. 2018800393558 dated Jun. 2, 2021, 10 pages.

(56) References Cited

OTHER PUBLICATIONS

Japanese Office Action dated Feb. 16, 2021 for Japanese Patent Application No. 2019-560631, 7 pages (including translation).
Office Action received for Indian Patent Application Serial No. 201947044868 dated Aug. 3, 2021, 6 pages.
Notification of Reason for Refusal received for Korean Patent Application Serial No. 10-2019-7035966 dated May 20, 2021, 9 pages. (Including English Translation).
Qualcomm Incorporated, "UE-RS based Open-loop and Semi-open-loop Transmission", 3GPP TSG RAN WG1 #84bis, 3GPP, R1-163044, Apr. 11-15, 2016, 3 pages.
Second Office Action received for Chinese Patent Application Serial No. 201880039355.8 dated Jan. 4, 2022, 18 pages (Including English Translation).
Japanese Office Action received for Japanese Patent Application No. 2019-560631 dated Oct. 28, 2021, 9 pages (Including English Translation).
Notification of Reason for Refusal received for Korean Patent Application Serial No. 10-2019-7035966 dated Nov. 20, 2021, 9 pages. (Including English Translation).
Non-Final Office Action received for U.S. Appl. No. 17/196,830 dated Apr. 19, 2022, 44 pages.
Notification to Grant Patent Right for Invention received for Chinese Patent Application Serial No. 201880039355.8 dated Apr. 13, 2022, 4 pages (Including English Translation).
Grant of Patent received for Korean Patent Application Serial No. 10-2019-7035966 dated May 9, 2022, 4 pages (Including English Translation).
Japanese Office Action received for Japanese Patent Application No. 2019-560631 dated Jun. 21, 2022, 6 pages (Including English Translation).

* cited by examiner

FACILITATION OF MULTIPLE INPUT MULTIPLE OUTPUT COMMUNICATION FOR 5G OR OTHER NEXT GENERATION NETWORK

RELATED APPLICATIONS

The subject patent application is a continuation of, and claims priority to each of, U.S. patent application Ser. No. 16/578,834 (now U.S. Pat. No. 10,887,784), filed Sep. 23, 2019, and entitled "FACILITATION OF MULTIPLE INPUT MULTIPLE OUTPUT COMMUNICATION FOR 5G OR OTHER NEXT GENERATION NETWORK," which is a continuation of U.S. patent application Ser. No. 15/624,407 (now U.S. Pat. No. 10,470,072), filed Jun. 15, 2017, and entitled "FACILITATION OF MULTIPLE INPUT MULTIPLE OUTPUT COMMUNICATION FOR 5G OR OTHER NEXT GENERATION NETWORK," the entireties of which applications are hereby incorporated by reference herein.

TECHNICAL FIELD

This disclosure relates generally to facilitating multiple input multiple (MIMO) output communication. For example, this disclosure relates to improving user equipment performance at high Doppler frequencies for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a multiple input multiple output is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
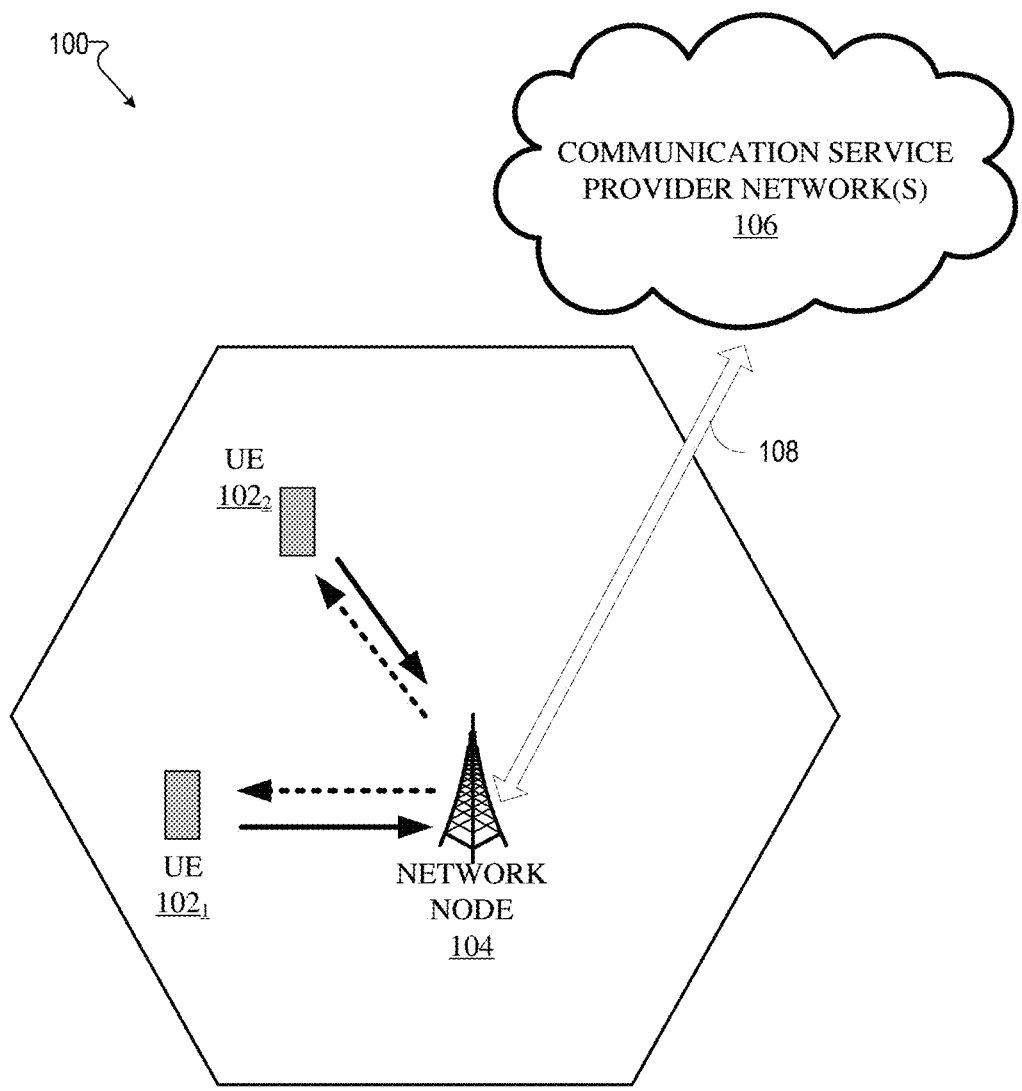
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate multiple input multiple output (MIMO) communication for a 5G air interface or other next generation network. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate MIMO for a 5G network. Facilitating MIMO for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of network nodes (e.g., network node 104) can include but are not limited to: NodeB devices, base station (BS) devices, mobile stations, access point (AP) devices, and radio access network (RAN) devices. The network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the node is referred to by some as a gNodeB device.

Cloud radio access networks (RAN) can enable the implementation of concepts such as software-defined network (SDN) and network function virtualization (NFV) in 5G networks. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

When the UE detects that it is moving with a high Doppler frequency, then it can communicate to the network to change the transmission type (e.g., from closed loop MIMO to rank-1 precoder cycling). With rank-1 precoder cycling, the network can use random precoders at the transmission side. Once the network receives the recommendation, the network can decide whether to choose the UE recommendation of transmission type change (e.g., from closed loop MIMO to rank-1 precoder cycling and vice versa). In another embodiment, the network can decide on its own to change to rank-1 precoder cycling when a load of the cell is high. For example, if the number of RRC connected users is greater than a defined load threshold, then to reduce the feedback channel overhead in the cell, the network can decide to use rank-1 precoder cycling to leverage the reduced feedback channel overhead of rank-1 precoder cycling as opposed to closed loop MIMO.

The rank-1 precoder cycling can be applied either at the resource block level (RB) or at the group of RB level. The main idea of this rank-1 random precoding is that when the rank equals to one, the reliability of the transmitted signal increases, thereby reducing the CSI estimation error due to the high Doppler shift between the transmitter and the receiver. Conversely, whenever the network detects the UE has reduced its speed (e.g., moving at a slower speed), it can inform the UE to change the transmission type to a closed loop MIMO type to report CSI via a conventional methodology. Several methodologies are discussed herein for changing the transmission type. The network node can change the transmission type for downlink transmission based on a recommendation from the UE. For example, the UE can recommend the network to change to the rank-1 precoder cycling with an explicit or implicit indication to the network.

The UE can compute the Doppler metric (i.e., the UE speed) and if the UE speed is greater than a pre-defined threshold, the UE can recommend a transmission mode change to the network. The UE can explicitly send this recommendation as part of an uplink feedback channel CSI reporting. Additionally, there are multiple methods to compute the Doppler metric or the speed of the UE. For example, the UE can compute the direct speed of the UE, at multiple time or distance intervals, by a global positioning system (GPS). Then, the Doppler metric can be taken as an average of the individual speed measurements. Additionally, a rate of change of downlink channel estimates can be calculated to provide a Doppler metric ($D_m$) associated with the rate of change of the downlink channel. A rate of change of channel quality information can be calculated by letting the channel quality information be reported by the UE to the network at any given time interval via Equation (1):

$$D_m = \Delta CQI/\Delta T, \qquad \text{Equation 1:}$$

where $\Delta CQI$ represents the rate of change of CQI over K.

The rate of change of precoder matrix index information can be represented by Equation (2):

$$D_m = \Delta PMI/\Delta T, \qquad \text{Equation 2:}$$

where PMI is the precoder matrix index to be reported by the UE to the network at any given time interval. Let $\Delta PMI$ represent the rate of change of PMI over K.

In another embodiment, the UE can communicate this information as an implicit indication to the network, for example, using an unused combination of the already existing CSI fields. Thus, the UE can inform the network about the preference of transmission type based on the speed of the UE, based on the rate of change of downlink channel estimates, based on the rate of change of channel quality information, and/or based on the rate of change of precoding matrix index. The UE can also send this communication as part of channel state information reporting and/or as part of unused combinations in the channel state information reporting.

Alternatively, the network node can change the rank-1 precoder cycling based on the RRC load. The RB level rank-1 precoder cycling can be transparent to the UE and the UE feedback is only CQI. The feedback channel overhead is very low with rank-1 precoder cycling. Thus, if the network experiences a heavy load in the uplink feedback channel from multiple UEs configured in closed loop MIMO mode, then the network can reduce the uplink feedback contention by changing some UEs configured in closed loop MIMO mode to rank-1 precoder cycling mode. For example, the network can determine the load of the cell by looking at the RRC connected devices, and if the load is greater than a pre-defined threshold, then it can measure the Doppler metrics of the corresponding UEs, and check if the Doppler metrics are greater than a pre-defined threshold or not. If the $D_m$ is greater than a pre-defined threshold, then the network node can change the transmission type of the UEs whose $D_m$ exceeds the threshold. There are multiple ways the network can compute the Doppler metric for a particular UE. For example, the gNodeB can compute a direct speed measurement of the UE, by positioning or GPS at multiple intervals. Then the $D_m$ can be taken as an average of the individual speed measurement. The gNode B can also estimate the rate of change of the uplink channel to produce a Doppler metric.

The rate of change of channel quality information can be reported by the UE at any given time interval. The rate of change of Precoder matrix index information can be reported by the UE to the network at any given time interval. Thus the network can decide the transmission type and configure the UE based on a load of the cell. The network can also configure the UE transmission type based on the load and the Doppler metric computed by the network or by the mobile device.

Additionally, the network node can change to rank-1 precoder cycling based on the RRC load and the UE recommendation, whereby the network can determine the transmission type and configure the UE based on the load of the cell and the UE recommendation.

In one embodiment, described herein is a method comprising sending, to a network device by a mobile device comprising a processor, an indication that a condition associated with the mobile device has been determined to have been satisfied. Based on the condition being determined to have been satisfied, the method can comprise sending, by the mobile device to the network device, recommendation data associated with a recommendation for the network device to adjust a transmission type of a transmission between the mobile device and the network device. Additionally, in response to the sending the recommendation data, the method can comprise receiving, by the mobile device from the network device, the transmission according to the transmission type.

According to another embodiment, a system can facilitate, determining a network load experienced by an uplink feedback channel associated with a network device and mobile devices of a wireless network. Based on the network load, the system can determine whether a condition associated with the network load has been satisfied, and in response to the determining that the condition has been satisfied, the system can adjust a transmission type of a mobile device of the mobile devices to reduce a feedback associated with an uplink signal of the uplink feedback channel, wherein adjusting the transmission type comprises adjusting the transmission type to a rank-one precoder cycling transmission type.

According to yet another embodiment, described herein is a machine-readable storage medium that can perform the operations comprising determining that a condition associated with a network load of a network device of a wireless network has been satisfied. The machine-readable storage medium can perform operations comprising, in response to the determining, receiving, from a mobile device of the wireless network, recommendation data associated with a recommendation for the network device to adjust a transmission type of a transmission between the mobile device and the network device. Consequently, in response to the receiving the recommendation data and determining that the condition is satisfied, the system can facilitate adjusting the transmission between the mobile device and the network device to be of the transmission type.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, pico-cell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Note that using multi-antennas does not always mean that MIMO is being used. For example, a configuration can have two downlink antennas, and these two antennas can be used in various ways. In addition to using the antennas in a 2×2 MIMO configuration, the two antennas can also be used in a diversity configuration rather than MIMO configuration. Even with multiple antennas, a particular configuration might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 2:
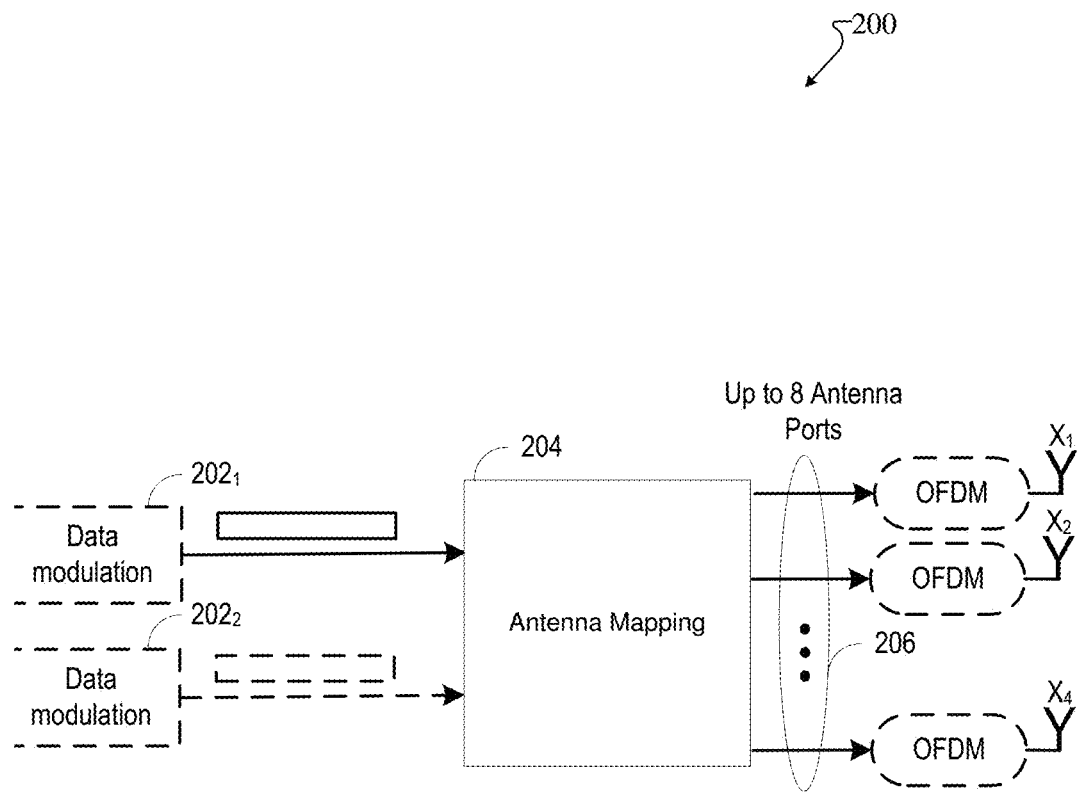
FIG. 2 illustrates an example schematic system block diagram of a 4G MIMO transmission according to one or more embodiments.

Referring now to FIG. 2, illustrated is an example schematic system 200 block diagram of a 4G MIMO transmission using up to two code words of encoded data, mapped to up to eight antenna ports according to one or more embodiments. A similar structure can be used for 5G systems with more antenna ports. Antenna mapping 304 in general, can be described as a mapping from the output of a data modulation 2021, 2022 to the different antenna ports 206. The input to the antenna mapping 204 can comprise modulation symbols (QPSK, 16QAM, 64QAM, 256QAM) corresponding to the one or two transport blocks. To be more specific, there can be one transport block per transmit time interval (TTI) except for spatial multiplexing, in which case there can be up to two transport blocks per TTI. The output of the antenna mapping can be a set of symbols for each antenna port. The symbols of each antenna port can be subsequently applied to the OFDM modulator $X_1, X_2 \ldots X_4$ (e.g., mapped to the basic OFDM time-frequency grid corresponding to that antenna port). It should be noted that although simulations are shown with 4 transmit antennas, the same principle can be applied with $N_{tx}$ systems with rank equal to $N_{tx}$, where $N_{tx}$ can be 2, 4, 8, or 16 and so on.

Figure 3:
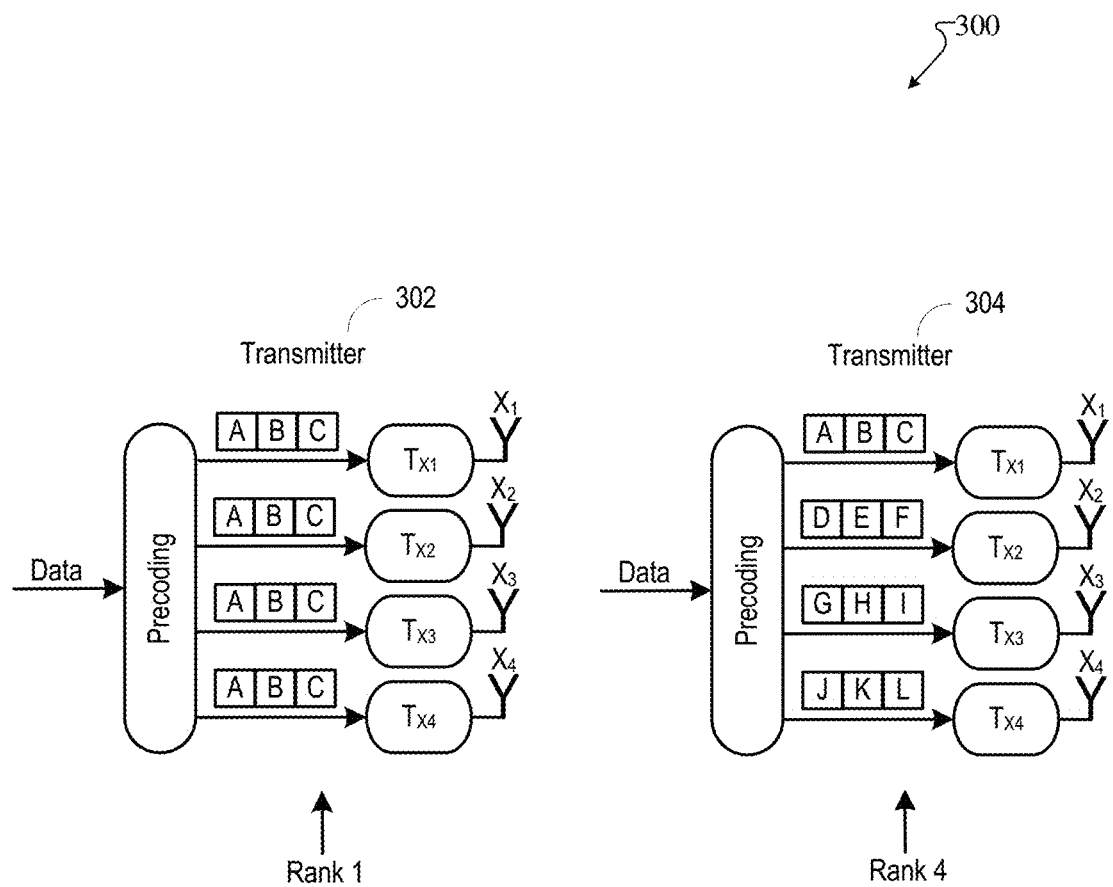
FIG. 3 illustrates an example of the concept of rank according to one or more embodiments

Now referring to FIG. 3, another concept is that of the rank of the transmission. In multiple antenna techniques 300, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna can transmit the same information. The term spatial layer refers to a data stream that includes information not included at the other layers. The rank of the transmission can be equal to the number of spatial layers in an LTE spatial multiplexing transmission, or, put in another way, the number of different transmission layers transmitted in parallel. As shown in FIG. 3, a multiple antenna transmitter 302 transmits in parallel on all four antennas the same content or information (e.g., A, B, and C) to the user equipment. Even though the information in each layer may be manipulated in different ways by mathematical operations, these operations do not change the information transmitted, and as such, the transmitter 302 can be referred to as operating as a rank-1 transmitter. In a multi-antenna transmitter 304, different pieces of information (e.g., ABC, DEF, GHI, and JKL) can be transmitted in parallel simultaneously in four different layers, and as such transmitter 304 can operate as a rank-4 transmitter.

Figure 4:
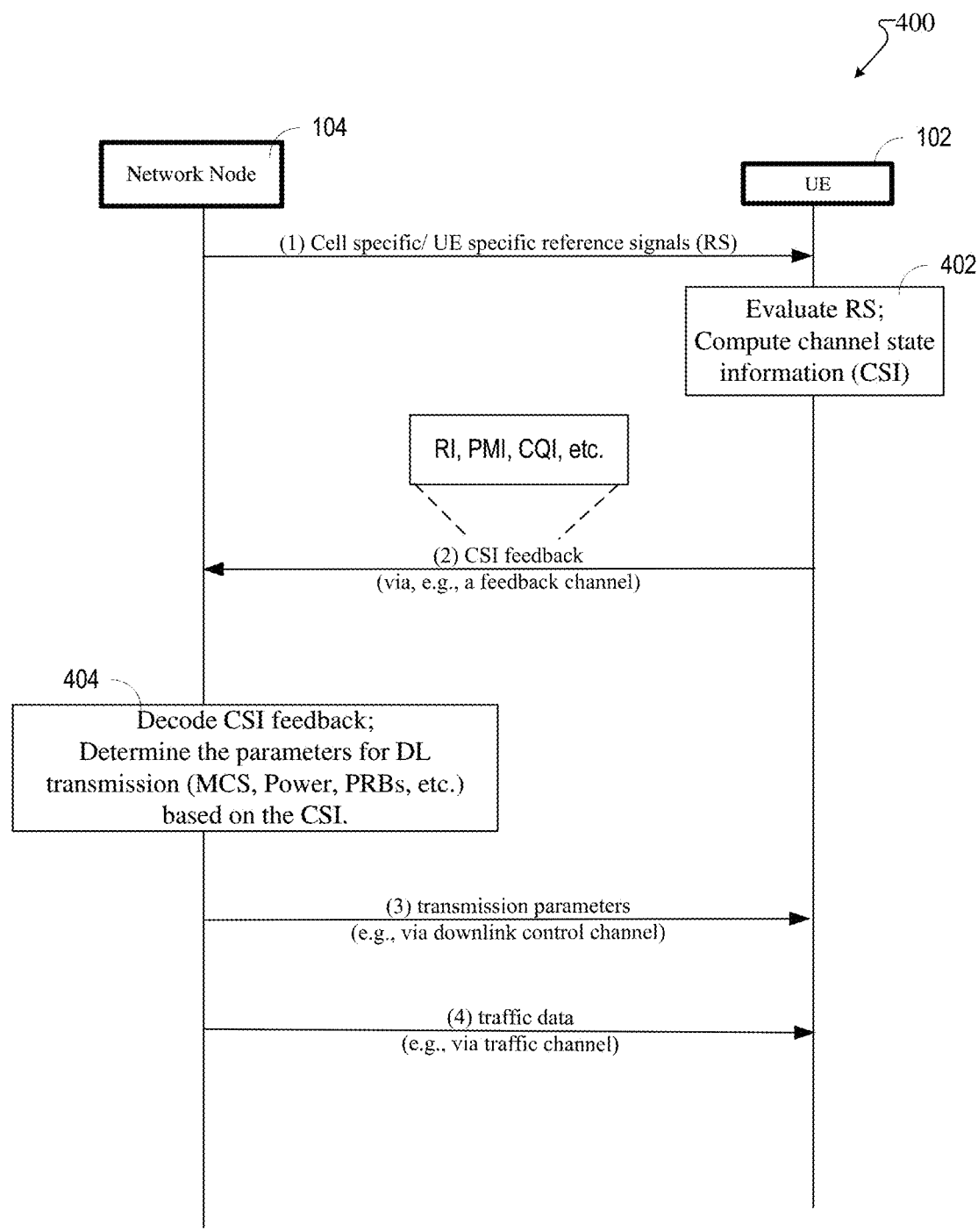
FIG. 4 illustrates an example system comprising a wireless transmission between a network node and user equipment.

Referring to FIG. 4, a system 400 comprising a network node (e.g., network node 104), can transmit a reference signal (RS) at transaction (1), which can be beam formed or non-beam formed, to a user equipment (e.g., UE 102). FIG. 4 illustrates a transaction diagram (e.g., sequence chart) involving a closed loop spatial multiplexing transmission that uses codebook-based precoding (wherein open loop systems do not require knowledge of the channel at the transmitter, while closed loop systems require channel knowledge at the transmitter, provided by a feedback channel by a UE). Briefly described, in this technique, a reference signal is first sent from the network node to the UE. From the reference signals, the UE can compute the channel estimates and the parameters needed for channel state information (CSI) reporting. In LTE, the CSI report comprises the channel quality indicator (CQI), precoding matrix index (PMI), rank information (RI), etc. The CSI report is sent to the network node via a feedback channel either on a periodic basis or on demand based CSI (e.g., aperiodic CSI reporting). The network node scheduler can use this information in to choose the parameters for scheduling of this particular UE. The network node can send the scheduling parameters to the UE on the downlink control channel called the physical downlink control channel (PDCCH). After that, actual data transfer can take place from the network node to the UE on the physical downlink shared channel (PDSCH).

Downlink reference signals are predefined signals occupying specific resource elements within the downlink time-frequency grid. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

After receiving this reference signal, at block 402, the UE 102 can evaluate the reference signal and compute CSI, which can be transmitted to the network node as CSI feedback (e.g., a CSI report). The CSI feedback can comprise an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

The indicator of channel state information (e.g., PMI in LTE) can be used for selection of transmission parameters for the different data streams transmitted between the network node and the UE. In techniques using codebook-based precoding, the network node and UE use different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE can transmit feedback that comprises recommendations for a suitable precoding matrix out of the appropriate codebook (e.g., points the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE.

Additionally, the CSI feedback can comprise an indicator of channel quality (e.g., in LTE the channel quality indicator (CQI)), which indicates the channel quality of the channel between the network node and the user equipment for link adaptation on the network side. Depending which value a UE reports, the node can transmit data with different transport block sizes. If the node receives a high CQI value from the UE, then it can transmit data with larger transport block size, and vice versa.

Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

After computing the CSI feedback, the UE 102 can transmit the CSI feedback at transaction (2), via a feedback channel, which can be a channel separate from the channel from which the reference signal was sent. The network node 104 can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 104, as shown in block 404 of FIG. 2, can comprise decoding the CSI feedback. The UE can decode the RI and then use the decoded information (for example, the obtained size of the CSI) to decode the remainder of the CSI feedback (e.g., the CQI, PMI, etc.). The network node 104 can use the decoded CSI feedback to determine a suitable transmission protocol, which can comprise modulation and coding schemes (MCS) applicable to modulation and coding of the different transmissions between the network node 104 and the UE 102, power, physical resource blocks (PRBs), etc.

The network node 104 can transmit the parameters at transaction (3) to the UE 102 via a downlink control channel. Thereafter and/or simultaneously, at transaction (4), traffic data (e.g., non-control data such as data related to texts, emails, pictures, audio files videos, etc.) can be transferred, via a data traffic channel, from the network device 104 to the UE 102.

The performance of closed loop MIMO systems degrades at high UE speeds (e.g., a mobile device moving at high speeds). The result of UEs moving at high speeds results in the Doppler effect, whereby the Doppler shift occurs when the transmitter of a signal is moving in relation to the receiver. This relative movement shifts the frequency of the signal, such that it is perceived to be different at the receiver than at the transmitter. In other words, the frequency perceived by the receiver will differ from the frequency that was actually emitted by the transmitter. The performance degradation is severe when the signal to noise ratio (SNR) is high. If the rank in transmission is high, it is also the case that the SNR is high. For high rank systems, the impact due to mismatch between the transmitter and receiver channel qualities is severe.

Figure 5:
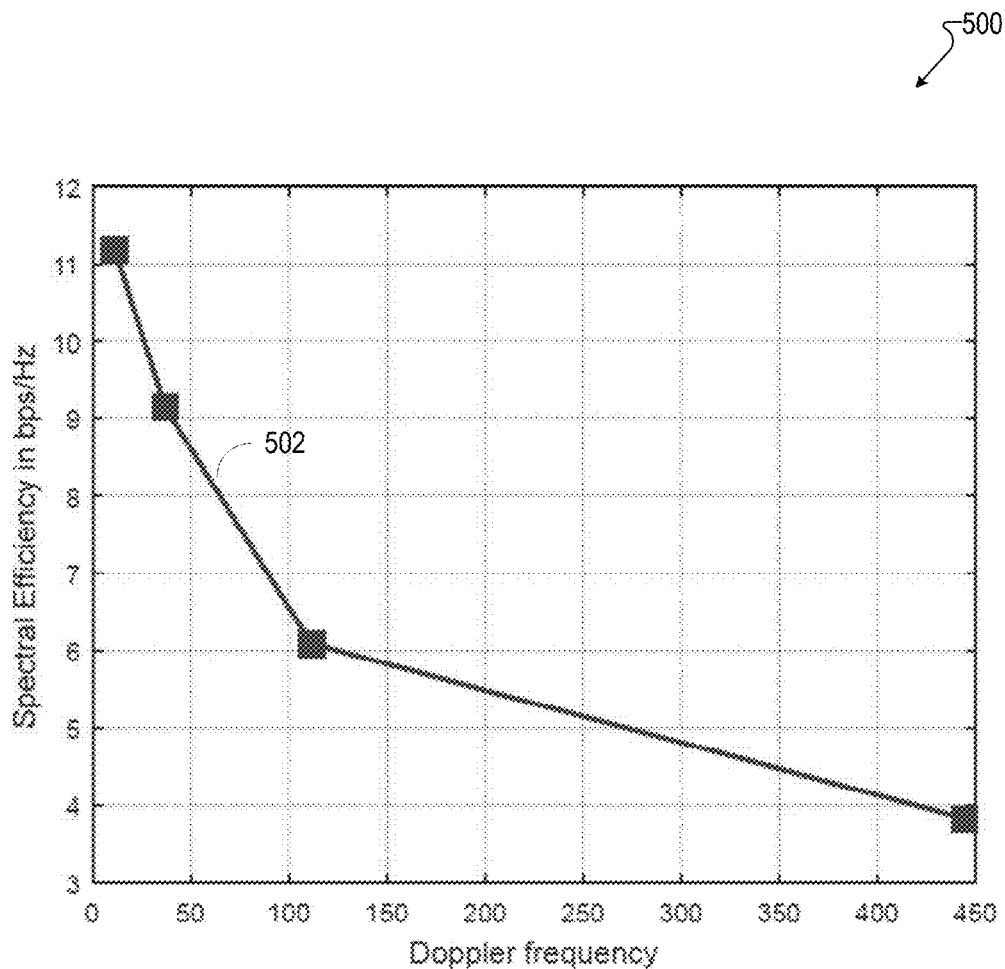
FIG. 5 illustrates a graph showing the spectral efficiency of a closed loop MIMO protocol as a function of Doppler frequency in accordance with one or more embodiments.

FIG. 5 illustrates a graph 500 that shows a plot 502 of the spectral efficiency for closed loop MIMO system with 4 transmit and 4 receive antennas at high SNR of 25 dB for different UE speeds (shown in Doppler frequency). While the line plot 502 is for a system having 4 transmit and 4 receive antennas, a similar spectral efficiency and Doppler frequency relationship applies for $N_{tx}$ systems with rank equal to $N_{tx}$, where $N_{tx}$ can be 2, 4, 8, 16, and so on. From observing FIG. 5, as the speed of the UE increases, the throughput decreases due to the outdated channel state information (e.g., the Doppler shift prevents the measurement by the UE of an accurate signal), such that the spectral efficiency drops as the Doppler frequency increases.

The present application describes example systems and methods that can improve the performance of MIMO systems (e.g., 5G MIMO systems) for high Doppler conditions. The system and methods involve identifying the UE speed, and determining whether a Doppler metric threshold has been met (or exceeded), and in response to the Doppler metric threshold being determined to be exceeded, recommending to the network node, via the UE, a change to a rank-1 precoder cycling protocol.

Figure 6:
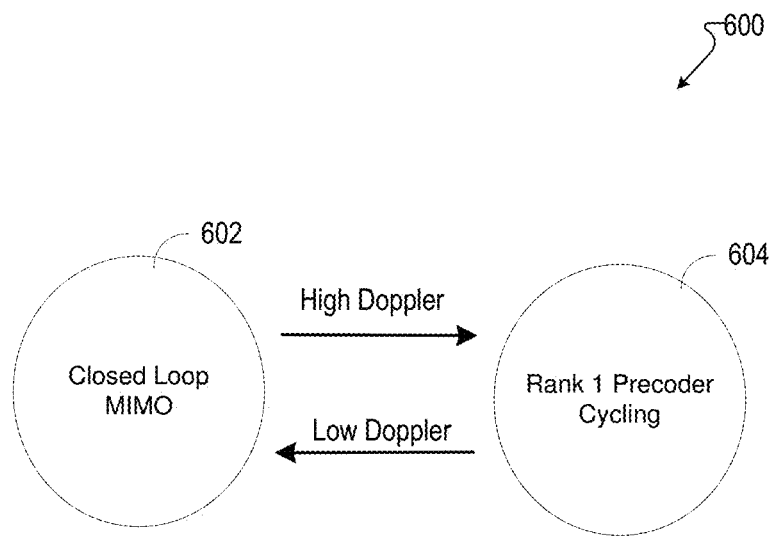
FIG. 6 illustrates a diagram showing example embodiments of toggling between a closed loop MIMO protocol and a rank-1 precoder cycling protocol in accordance with one or more embodiments.

FIG. 6 shows a diagram 600 providing an overview of some example embodiments. In example embodiments, the protocol for transmissions can move back and forth between a closed loop MIMO state 602, and a rank-1 precoder cycling state 604, wherein the network node 104 and the UE 102 establish rank-1 transmissions. In response to the network (e.g., network node 104) detecting that a UE (e.g., UE 102) is moving with a high Doppler frequency, resulting in a metric related to the Doppler frequency (e.g., $D_m$) being greater than a threshold (e.g., $D_{th}$), wherein the threshold can be a value equal to $D_m$, or a value greater than $D_m$, in example embodiments, the UE (e.g., UE 102) can communicate a recommendation to the network node (e.g., network node 104) suggests the network node change its reception protocol to be configured to engage in rank-1 (e.g., indicator of rank=1, or RI=1) precoder cycling. The network node can determine to change its reception protocol (e.g., configure resources) to enable it and the UE to send/receive signals transmitted with a rank-1 protocol (such as a rank-1 reference signal). With rank-1 precoder cycling, the network node can use random precoders at the transmission side. The rank-1 precoder cycling can be applied either at the resource block level (RB) or at the resource element level (RE). In high Doppler conditions, transmissions in which the rank equals to one can offer increased reliability, thereby reducing the CSI estimation error due to the high Doppler shift between the transmitter and the receiver. Similarly, whenever the network detects the UE changed its speed and moving with a slow speed, it can inform the UE to revert back to a closed loop MIMO mode to report CSI in a more conventional way (e.g., as described in FIG. 4 above).

Figure 7:
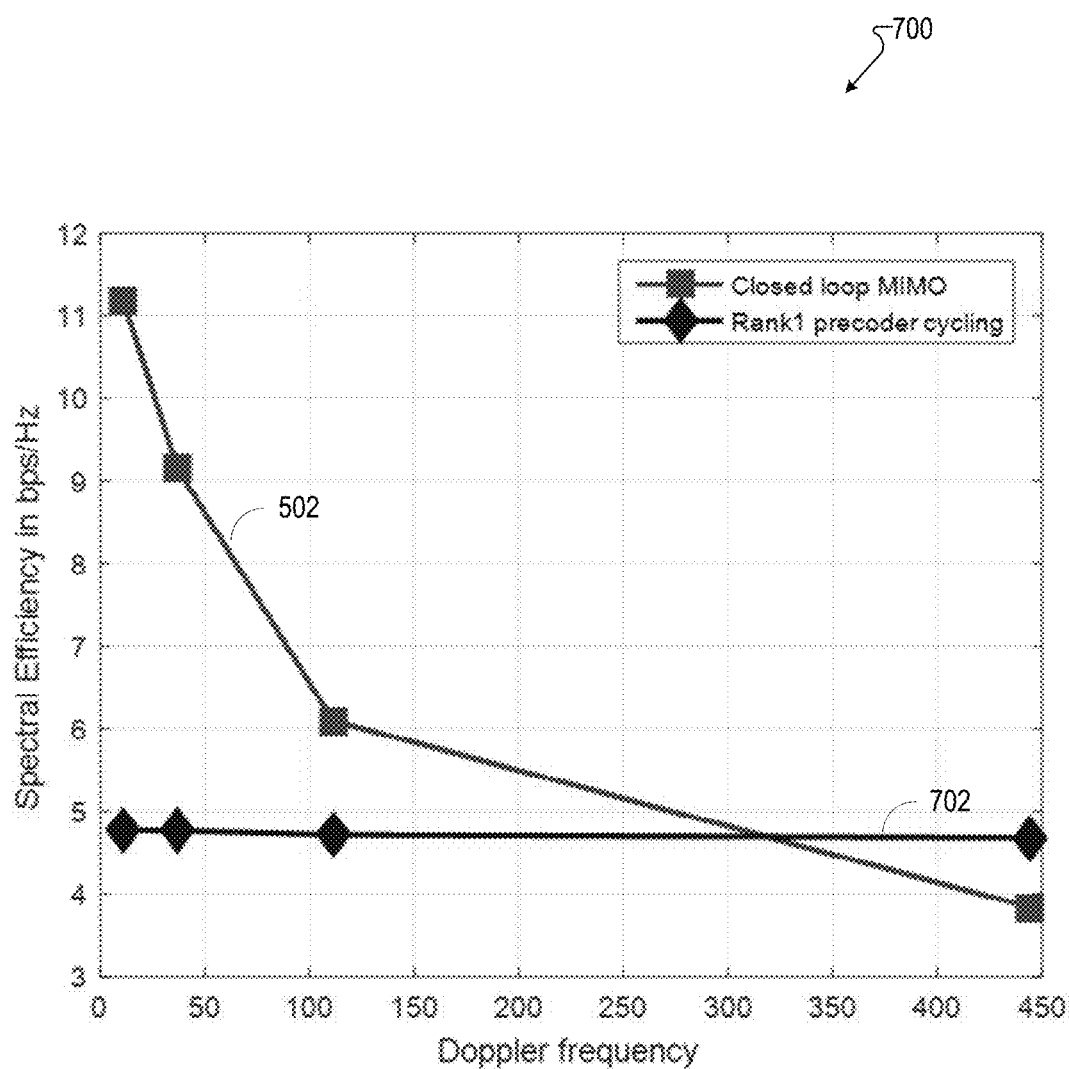
FIG. 7 illustrates a graph showing the spectral efficiency of both a closed loop MIMO protocol and a rank-1 precoder cycling protocol as a function of Doppler frequency, in accordance with various aspects and embodiments of the subject disclosure.

FIG. 7 shows a graph 700 depicting the spectral efficiency of transmissions using closed loop MIMO, contrasted with the spectral efficiency with rank-1 transmissions (e.g., the rank-1 precoder cycling transmissions described in this application). In addition to the plot 502 for the spectral efficiency of a close loop MIMO system as a function of Doppler frequency, FIG. 7 shows a second plot 702 of the spectral efficiency for transmissions relating to the rank-1 precoder cycling as a function of Doppler frequency with wideband CQI. It can be observed from FIG. 7 that the rank-1 precoder cycling performance varies very little. Referring to FIG. 7, at a certain Doppler frequency threshold, a rank-1 transmission can yield a greater spectral efficiency than the spectral efficiency of transmissions made using closed loop MIMO having a rank greater than 1. For example, in accordance with the example graph shown in FIG. 7, the UE (e.g., UE 102) can send a rank-1 precoder cycling recommendation to the network node (e.g., network node 104) when the UE's Doppler frequency is above the threshold of about 320.

Figure 8:
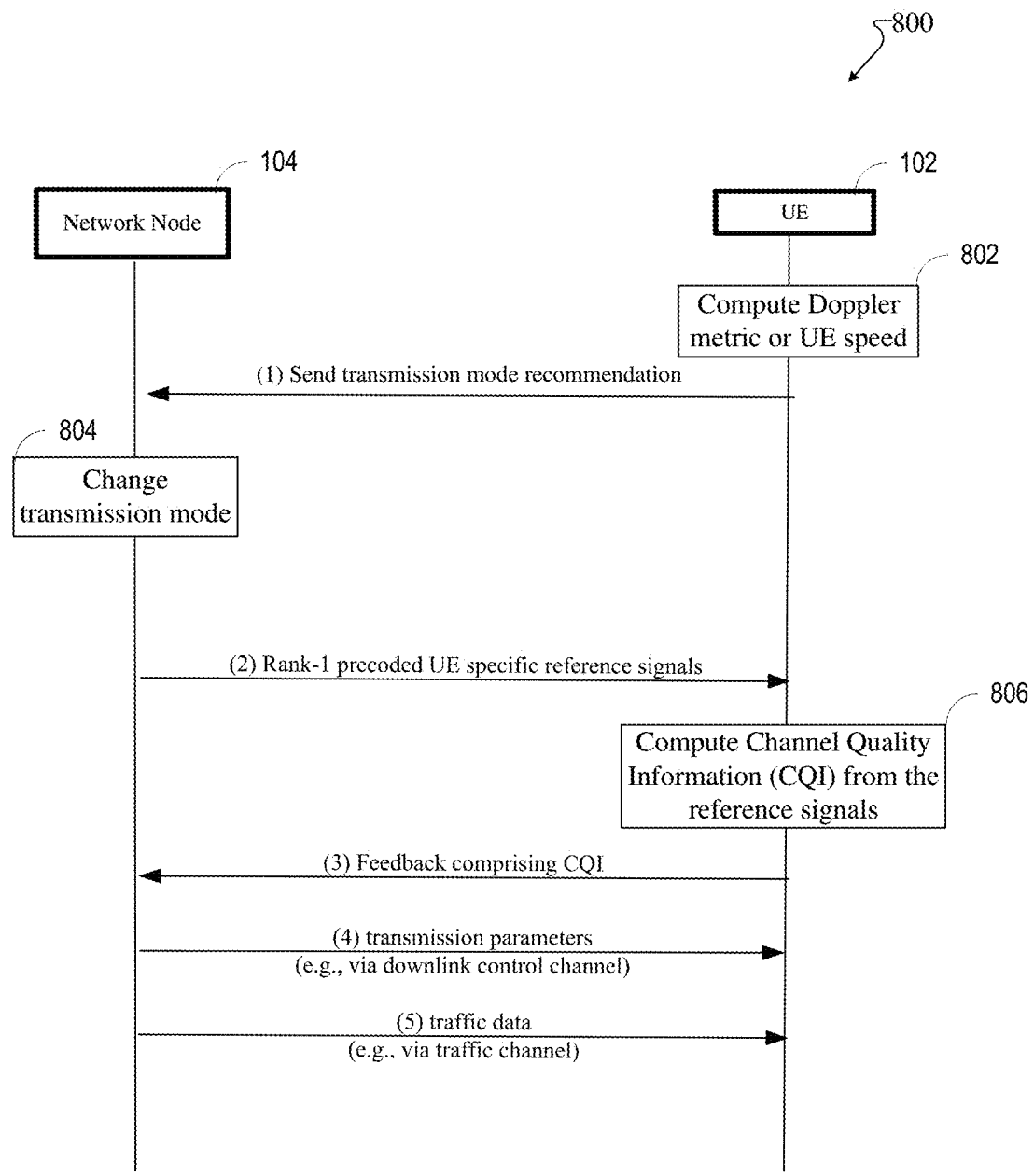
FIG. 8 illustrates a message sequence chart between a network node and a user equipment device for a rank-1 precoder cycling protocol, in accordance with one or more embodiments.

FIG. 8 shows an example of a transaction diagram 800 (e.g., sequence chart) in accordance with example embodiments in which the network node (e.g., network node 104) and UE (e.g., UE 102) enter into a rank-1 precoder cycling state when a Doppler metric exceeds a threshold. It should be noted that the Doppler metric can be computed via a variety of methods. For example, the $D_m$ can be computed based on a direct speed measurement. The UE 102 can determine its direct speed of the UE 102, for example, by using a global positioning system (GPS) to obtain speed measurements of the user equipment (e.g., determine the distance per time that the UE has moved). The speed measurements can be measured at different times (or, at multiple intervals). The UE 102 can determine a $D_m$ comprises the average of the speed measurements. In example embodiments, the Doppler metric can also be based on the rate of change of downlink channel estimates. Here, the UE 102 can estimate the downlink channel, and the rate of change of the downlink channel provides a measure of the Doppler metric $D_m$. The Doppler metric can also be based on the rate of change of the indicator of channel quality (e.g., CQI in LTE), wherein the CQI is the channel quality information reported in a CSI feedback by the UE at any given moment. Here, the Doppler metric can be the change of CQI ($\Delta$CQI) over change in time ($\Delta$T). The Doppler metric can thus be computed as $D_m = \Delta CQI/\Delta T$. Additionally, the $D_m$ can be computed as the rate of change of precoder matrix information, where the precoder matrix index is reported by the UE 102 at any given time interval.

Assume that the network node is receiving the CSI (conventional) from the feedback channel (e.g., operating in a closed loop spatial MIMO state 605, as shown in the example of FIG. 4. As the signals from the network node to the UE degrade from the Doppler effect, data transmissions can suffer from this effect, and reference signals from the network node can also suffer from this effect, which can result in CSI estimations based on a degraded reference signal. The UE 102 can compute a Doppler metric or UE speed at element 802. If the UE 102 determines that the Doppler frequency reaches or exceeds a threshold, then the UE can initiate transaction (1) whereby a transmission mode recommendation message can be sent to the network node 104 to recommend using a rank-1 precoder cycling signal. At element 804, the network node 104, in response to transmission mode recommendation, can determine to configure its resources to receive a rank-1 transmission. Next at transaction (2), the network node 104 can send a UE 102 specific reference signal as a rank-1 precoder transmission. The UE 102 can receive the reference signal and at block 806 evaluate the reference signal and compute an indicator of channel quality (CQI). At transaction (3), the UE 102 can return feedback comprising an indicator of channel quality via the rank-1 precoder cycling. Here, unlike the closed loop MIMO case of FIG. 4, it is not necessary for the UE to report back an indicator of rank (e.g., RI) or channel state information (e.g., PMI), since the network node has already made the decision to transmit at rank-1, and with characteristics that do not require a PMI feedback. It should be noted that the transaction (1) recommendation can also be sent as a part of CSI feedback via the feedback channel. The UE 102 can also send this communication as part of unused combinations in the CSI reporting.

In other embodiments, the network node can use transmissions precoded at the resource element (RE) level (not RB level). In this protocol, the network node can indicate what precoders it is planning to use at the RE level. The precoders can be fixed in a standard (e.g., the 5G standard) such that both the network and the UE knows about the precoders used at the RE level. The UE reports the CQI assuming that the network will use the pre-defined precoders.

In other embodiments, the network node 104 can change the rank-1 precoder cycling based on the RRC load. It should be noted that RB level rank-1 precoder cycling is transparent to the UE 102 and the UE 102 feedback is only CQI. The feedback channel overhead is very low with a rank-1 precoder cycling. Thus, if the network experiences a heavy load in the uplink feedback channel from multiple UEs $102_1$, $102_2$, ... $102_x$ configured in closed loop MIMO mode, then the network node 104 can reduce the uplink feedback by transitioning some UEs $102_1$, $102_2$, ... $102_x$ configured in closed loop MIMO mode to rank-1 precoder cycling. For example, the network node 104 can determine the load of the cell by looking at the RRC connected devices and if the load is greater than a pre-defined threshold, then it can measure the Doppler metrics of the corresponding UEs $102_1$, $102_2$, ... $102_x$, and determine if the Doppler metric is greater than a pre-defined threshold or not. If it is Doppler metric is greater than a pre-defined threshold, then the network node 104 can change the transmission configuration of the UEs $102_1$, $102_2$, ... $102_x$ which exceeded the threshold. Alternatively, the network node can request a recommendation from the UEs to recommend whether the network node should switch the UEs to rank-1 precoder cycling based on the $D_m$ associated with each UE. It should be understood that the network node 104 can also determine Doppler metrics associated with the UEs $102_1$, $102_2$, ... $102_x$, direct speed measurement, rate of change of uplink channel estimates, rate of change of channel quality information, and/or the rate of change of precoder matrix index information as mentioned above.

Figure 9:
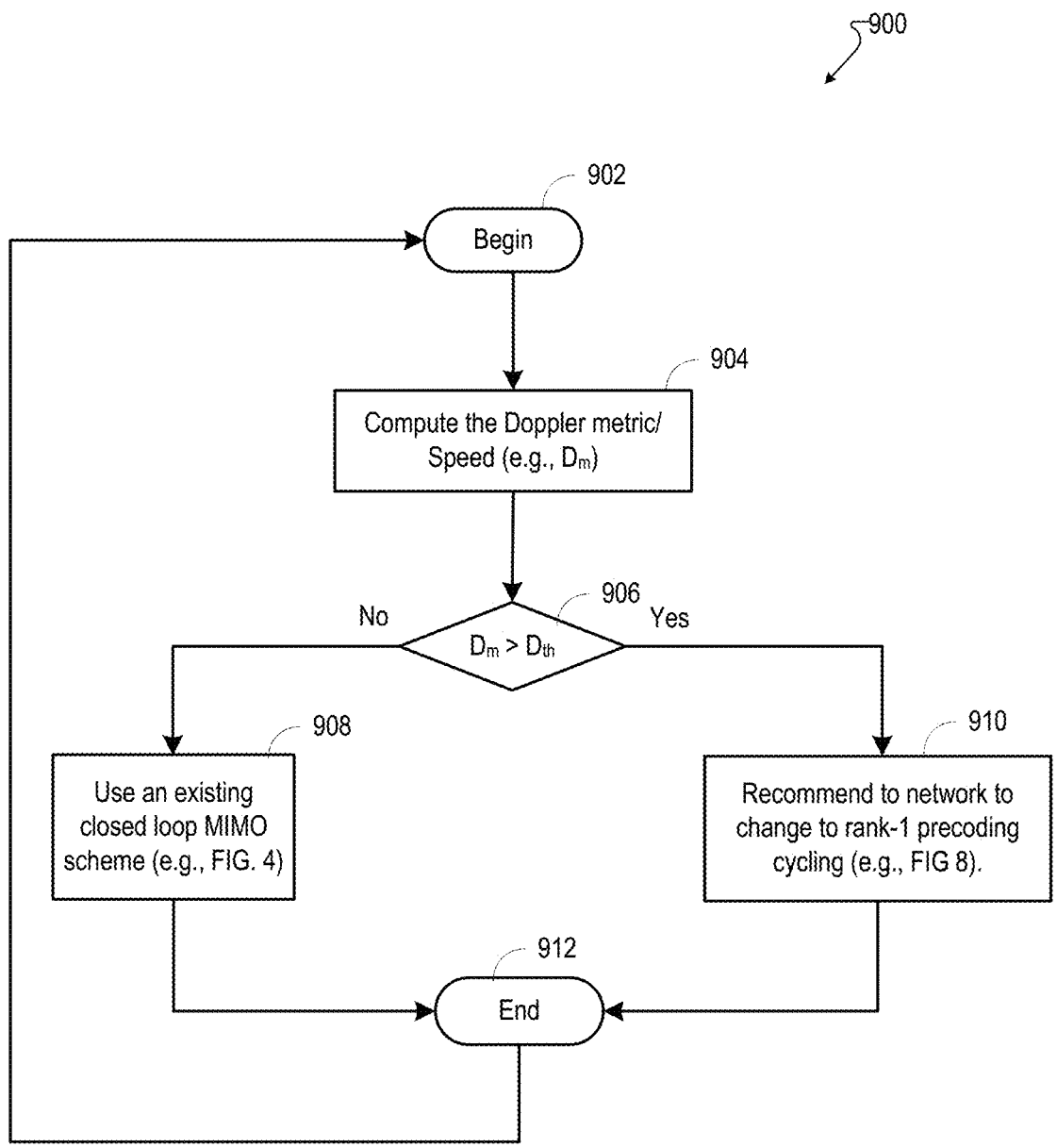
FIG. 9 illustrates an example flow chart having a Doppler metric as a decision criteria, in accordance with one or more embodiments.

FIG. 9 shows a flowchart 900 depicting an example method that can be performed by a network node (e.g., network node 104). The flowchart can begin at step 902, wherein it can be in a transmission state (e.g., closed loop MIMO, as described in the example of FIG. 4). At step 904, the network node can compute the Doppler metric and/or speed for the specific UE 102. At step 904, the network node determines whether the UE is moving at a high speed (high Doppler) or low speed (low Doppler). The network node can determine a Doppler metric ($D_m$) representative of the speed of the UE. Example embodiments of the Doppler metric can utilize various measurements as mentioned above with reference to FIG. 8.

Still referring to FIG. 9, a Doppler threshold (e.g., $D_{th}$) can be predefined, which is the point at which the spectral efficiency of MIMO is anticipated to degrade below the spectral efficiency level provided by a rank-1 transmission due to the Doppler effect (e.g., as shown in FIG. 7). At step 906, a determination can be made (e.g., by the UE 102) as to whether the Doppler metric associated with the UE 102 exceeds the threshold (e.g., $D_m > D_{th}$). If the Doppler metric associated with the UE 102 does not exceed the threshold, then at step 908, the operations between the network node and UE can continue to use an existing closed loop MIMO configuration (e.g., the example as described in FIG. 4). However, if the Doppler metric exceeds the threshold, then at step 910, the UE 102 can recommend a change to the network node to transition from the closed loop MIMO configuration to a rank-1 precoding cycling state (e.g., the example as described in FIG. 8). At step 912, the method can end, wherein the network node and UE carry on using an existing closed loop MIMO configuration, or using a rank-1 precoding cycling configuration. The process can repeat again at step 902. Thus, the UE can periodically determine whether the Doppler metric exceeds a threshold, and in response to that determination, recommend use of a rank-1 precoder cycling.

Figure 10:
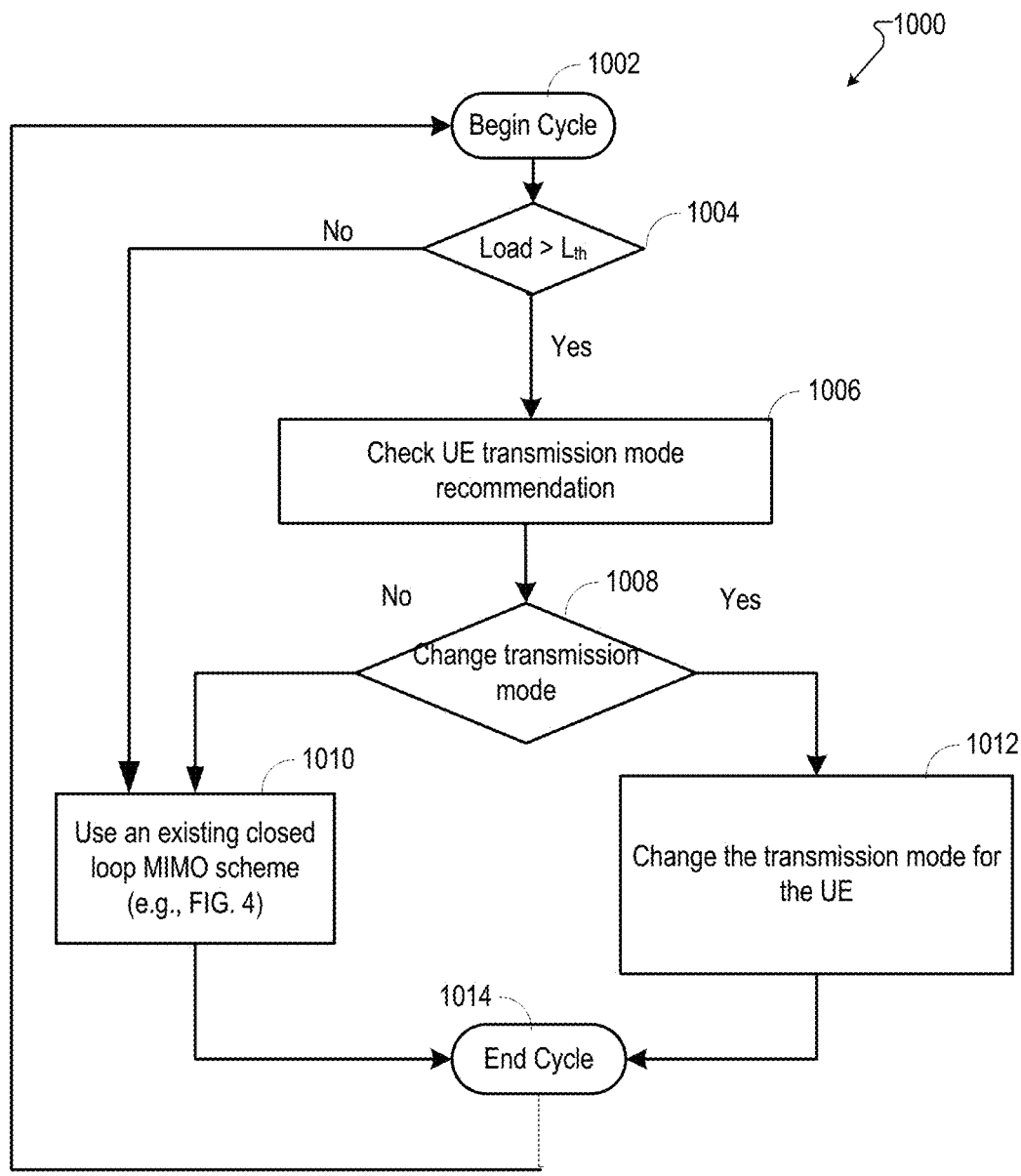
FIG. 10 illustrates an example flow chart having a load metric and a user equipment recommendation, based on a Doppler metric, as a decision criteria, in accordance with one or more embodiments.

FIG. 10 shows a flowchart 1000 depicting an example method that can be performed by a network node (e.g., network node 104) in which a rank-1 precoding cycling configuration is used in response to a load threshold and a Doppler metric exceeding a threshold. The flowchart can begin at step 1002, wherein it can be in a particular transmission state (e.g., closed loop MIMO, as described in the example of FIG. 4). At step 1004, the network node can determine if a load of the uplink feedback channel from multiple UEs 102 is greater than a predetermined load threshold ($L_{th}$). If the load is not greater than the $L_{th}$, then the network node can continue to use the closed loop MIMO at step 1010, which then leads to the end cycle step 1014. However, if the load is greater than the $L_{th}$, then the network node can check a UE transmission mode recommendation from a UE to determine if the network node should switch to the rank-1 precoding cycling configuration at step 1006. The UE recommendation can be based on Doppler metric data associated with the UE, which was determined by the UE, or by the network node. Based on the load being determined to be greater than the $L_{th}$ at step 1004, and the UE transmission mode recommendation at step 1006, the network node can make a decision to change the transmission mode from a closed loop MIMO at step 1008 to the rank-1 precoding cycling mode at step 1012, or remain in the closed loop MIMO transmission mode at step 1010. Either of these modes can then by followed by the end cycle step 1014. The process can repeat again at step 1002. Thus, the network node can periodically determine whether the load exceeds a threshold, and in response to that determination, consider a UE-based transmission mode recommendation, for the rank-1 precoding cycling mode based on the Doppler metric threshold being satisfied.

Figure 11:
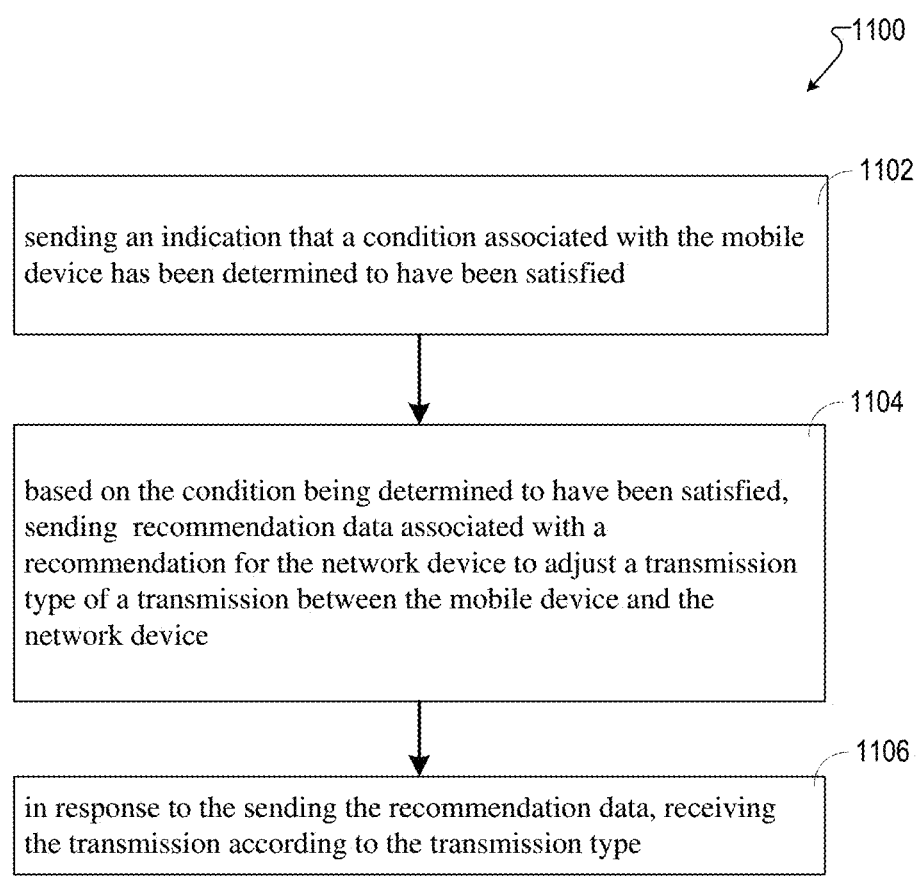
FIG. 11 illustrates operations that can be performed by a user equipment device relating to a rank-1 precoder cycling, in accordance with one or more embodiments.

In non-limiting embodiments, as shown in FIG. 11, chart 1100 can comprise a method for sending (e.g., via the UE 102), to a network device (e.g., network node 104) an indication that a condition associated with the mobile device (e.g., the UE 102) has been determined to have been satisfied at element 1102. At element 1104, based on the condition being determined to have been satisfied, the method can comprise sending, by the mobile device (e.g., the UE 102) to the network device (e.g., network node 104), recommendation data associated with a recommendation for the network device (e.g., network node 104) to adjust a transmission type of a transmission between the mobile device (e.g., the UE 102) and the network device (e.g., network node 104). Additionally, at element 1106 in response to the sending the recommendation data, the method can comprise receiving, by the mobile device (e.g., the UE 102) from the network device (e.g., network node 104), the transmission according to the transmission type.

Figure 12:
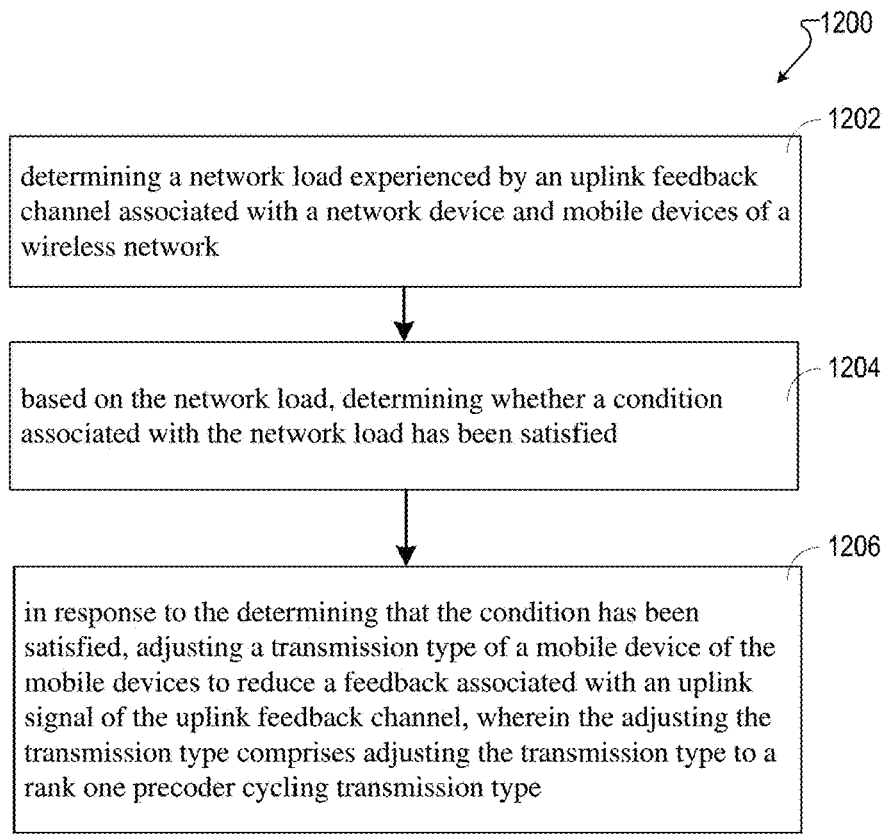
FIG. 12 illustrates operations that can be performed by a network node device relating to a rank-1 precoder cycling, in accordance with one or more embodiments.

In non-limiting embodiments, as shown in FIG. 12, chart 1200 can comprise a network node device is provided, comprising a processor and a memory that stores executable instructions that, when executed by the processor, facilitate performance of operations. The operations can comprise, determining a network load experienced by an uplink feedback channel associated with a network device (e.g., network node 104) and mobile devices (e.g., the UE 102) of a wireless network at element 1202. Based on the network load, at element 1204, the system can determine whether a condition associated with the network load has been satisfied. Additionally, in response to the determining that the condition has been satisfied at element 1204, the system can adjust a transmission type of a mobile device (e.g., the UE 102) of the mobile devices to reduce a feedback associated with an uplink signal of the uplink feedback channel at element 1206, wherein adjusting the transmission type comprises adjusting the transmission type to a rank one precoder cycling transmission type.

Figure 13:
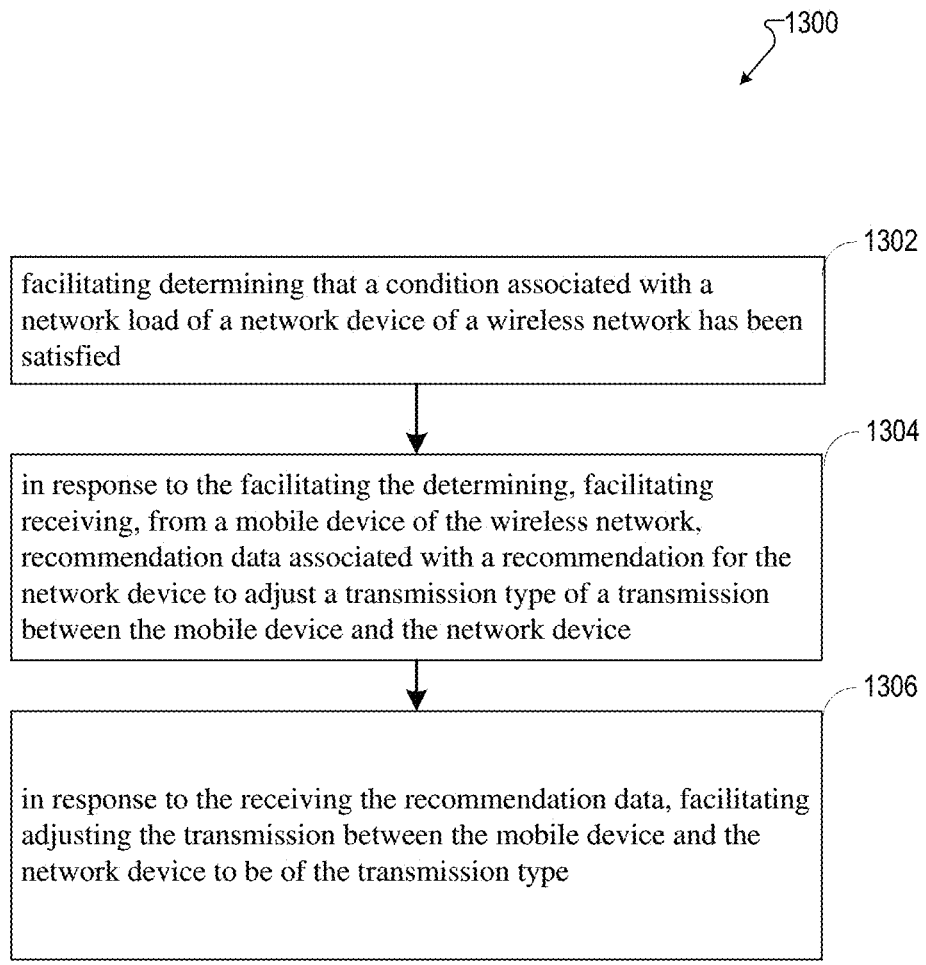
FIG. 13 illustrates operations that can be performed by a network node device relating to a rank-1 precoder cycling, in accordance with one or more embodiments.

In non-limiting embodiments, as shown in FIG. 13, chart 1300, a node device, comprising a processor and a memory that stores executable instructions that, when executed by the processor, facilitate performance of operations. At element 1302, the operations can comprise determining that a condition associated with a network load of a network device of a wireless network has been satisfied. At element 1304, the operations can comprise, in response to the determining, receiving, from a mobile device of the wireless network, recommendation data associated with a recommendation for the network device to adjust a transmission type of a transmission between the mobile device and the network device. Additionally, at element 1306, in response to the receiving the recommendation data and determining that the condition is satisfied, the operations can comprise facilitating adjusting the transmission between the mobile device and the network device to be of the transmission type.

Figure 14:
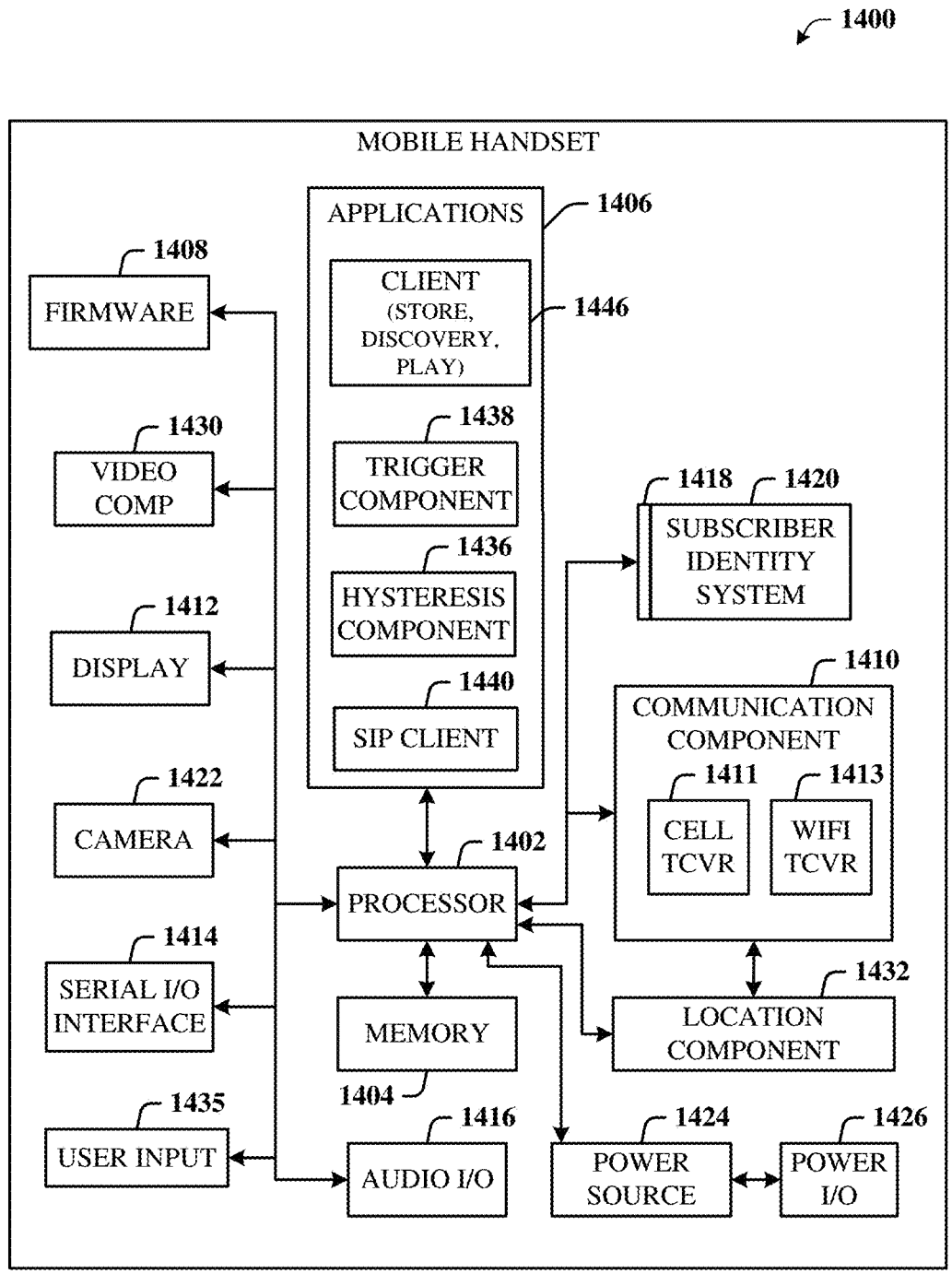
FIG. 14 illustrates an example block diagram of user equipment that can be a mobile handset in accordance with one or more embodiments.

Referring now to FIG. 14, illustrated is a schematic block diagram of a user equipment (e.g., user equipment 102) that can be a mobile device 1400 capable of connecting to a network in accordance with some embodiments described herein. Although a mobile handset 300 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a global GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
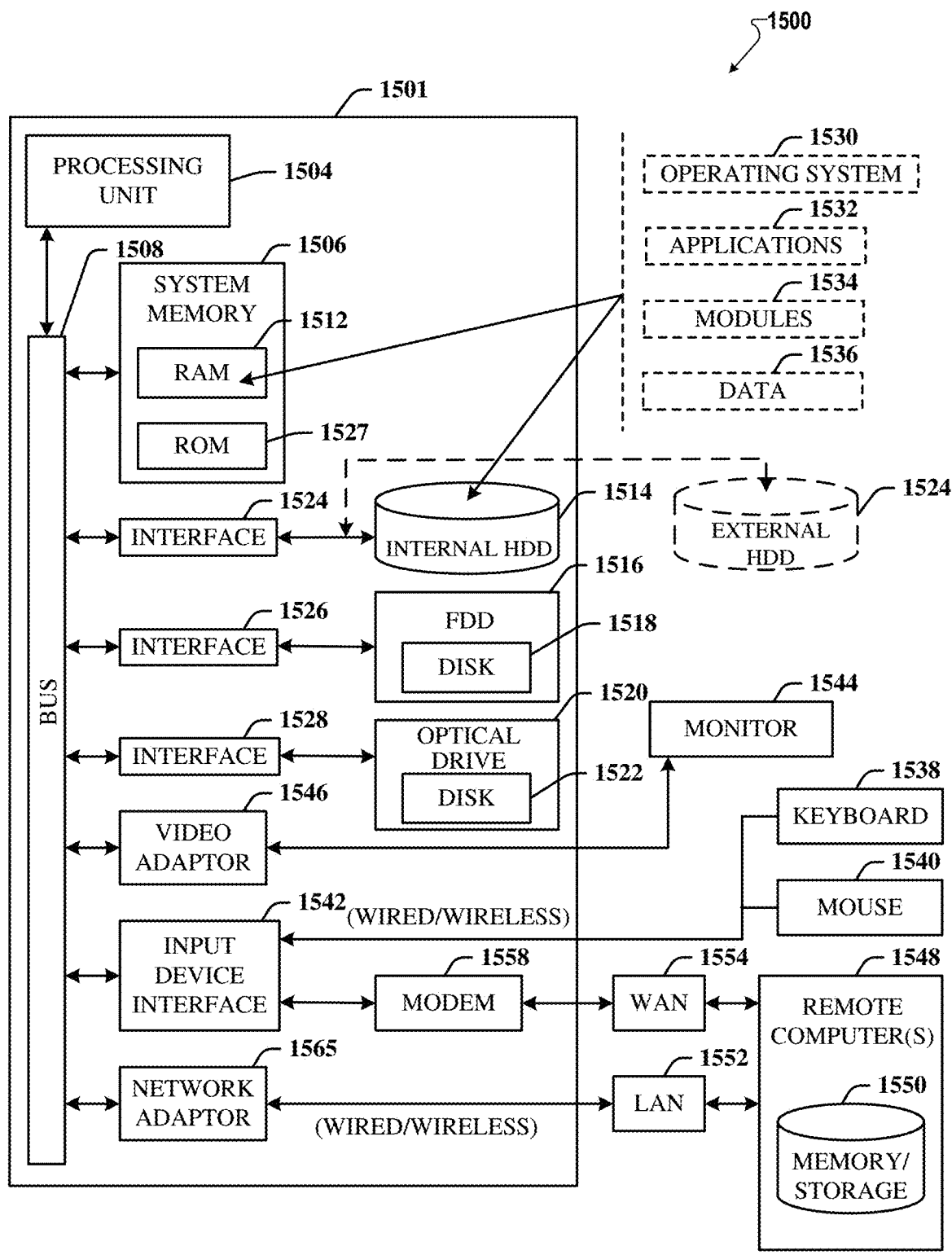
FIG. 15 illustrates an example block diagram of a computer that can be operable to execute processes and methods in accordance with various aspects and embodiments of the subject disclosure.

Referring now to FIG. 15, there is illustrated a block diagram of a computer 1500 operable to execute the functions and operations performed in the described example embodiments. For example, a network node (e.g., network node 104) may contain components as described in FIG. 15. The computer 1500 can provide networking and communication capabilities between a wired or wireless communication network and a server and/or communication device. In order to provide additional context for various aspects thereof, FIG. 15 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 15, implementing various aspects described herein with regards to devices can include a computer 1500, the computer 1500 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1527 and random access memory (RAM) 1512. A basic input/output system (BIOS) is stored in a non-volatile memory 1527 such as ROM, EPROM, EEPROM, which BIOS contains the basic routines that help to transfer information between elements within the computer 1500, such as during start-up. The RAM 1512 can also include a high-speed RAM such as static RAM for caching data.

The computer 1500 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1500 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1500, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1500 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 2394 serial port, a game port, a USB port, an IR interface, etc.

A monitor 1544 or other type of display device is also connected to the system bus 1508 through an interface, such as a video adapter 1546. In addition to the monitor 1544, a computer 1500 typically includes other peripheral output devices (not shown), such as speakers, printers, etc.

The computer 1500 can operate in a networked environment using logical connections by wired and/or wireless communications to one or more remote computers, such as a remote computer(s) 1548. The remote computer(s) 1548 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1500 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1500 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 through the input device interface 1542. In a networked environment, program modules depicted relative to the computer, or portions thereof, can be stored in the remote memory/storage device 1550. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
based on a condition, associated with a speed of a user equipment comprising a processor, being determined to have been satisfied, sending, to network equipment by the user equipment, recommendation data associated with a recommendation for the network equipment to adjust a transmission type of a transmission between the user equipment and the network equipment; and
further based on the condition being determined to have been satisfied, measuring, by the user equipment, a Doppler metric associated with the user equipment, wherein the Doppler metric is associated with a rate of change of precoder matrix index data as a function of time, and wherein the condition is further associated with a rate of change of a precoding matrix index that has changed from a first rate of change of the precoding matrix index to a second rate of change of the precoding matrix index.

2. The method of claim 1, further comprising:
in response to sending the recommendation data, receiving, by the user equipment from the network equipment, the transmission according to the transmission type, wherein the recommendation is associated with adjusting the transmission type from a closed loop multiple input multiple output transmission type to a rank one precoder cycling transmission type.

3. The method of claim 1, further comprising:
sending, by the user equipment, an indication of the condition via a channel state data transmission between the user equipment and the network equipment.

4. The method of claim 3, wherein the indication is sent as a part of a channel state data reporting, and wherein the part of the channel state data reporting is associated with unused combinations in the channel state data reporting.

5. The method of claim 1, wherein the condition is further associated with a rate of change of channel quality data that has changed from a first rate of change of a channel quality estimate to a second rate of change of the channel quality estimate.

6. The method of claim 1, wherein the condition is further associated with a rate of change of a downlink channel estimate that has changed from a first downlink channel estimate to a second downlink channel estimate.

7. A system, comprising:
a processor; and
a memory that stores executable instructions that, when executed by the processor, facilitate performance of operations, comprising:
in response to a condition associated with a speed of a user equipment being determined to have been satisfied, sending recommendation data associated with a recommendation for network equipment to adjust a transmission type of a transmission between the user equipment and the network equipment; and
in further response to the condition being determined to have been satisfied, determining a Doppler metric associated with the user equipment, wherein the Doppler metric is associated with a rate of change of precoder matrix index data as a function of time, and wherein the condition is associated with a rate of change of a downlink channel estimate that has changed from a first downlink channel estimate to a second downlink channel estimate.

8. The system of claim 7, wherein the operations further comprise:
facilitating receiving of the transmission, at the user equipment, according to the transmission type, wherein the condition is associated with a predefined threshold speed of with the user equipment.

9. The system of claim 7, wherein determining the Doppler metric comprises measuring the Doppler metric in accordance with a global positioning system associated with the user equipment.

10. The system of claim 7, wherein determining the Doppler metric comprises determining the Doppler metric based on a time interval.

11. The system of claim 7, wherein determining the Doppler metric comprises determining the Doppler metric based on a distance interval of travel associated with the user equipment.

12. The system of claim 7, wherein the function of time is a first function of time, and wherein the Doppler metric is associated with a rate of change of channel quality data as a second function of time.

13. A non-transitory machine-readable medium, comprising executable instructions that, when executed by a processor, facilitate performance of operations, comprising:
based on a condition associated with a speed of a mobile device of a network being determined to have been satisfied, receiving, from the mobile device, recommendation data associated with a recommendation for network equipment of the to adjust a transmission type of a transmission between the mobile device and the network equipment; and
based on the recommendation data, facilitating adjusting the transmission between the mobile device and the network equipment in accordance with the transmission type, and measuring a Doppler metric associated with the mobile device, wherein the Doppler metric is associated with a rate of change of precoder matrix index data as a function of time, and wherein the Doppler metric is received via a channel state data transmission associated with the transmission between the mobile device and the network equipment.

14. The non-transitory machine-readable medium of claim 13, wherein the transmission type of the transmission is adjusted from a multiple input multiple output transmission of a multiple input multiple output transmission type to a rank one precoder transmission of a rank one precoder transmission type.

15. The non-transitory machine-readable medium of claim 13 wherein facilitating adjusting of the transmission is opposite to the recommendation to adjust the transmission type, resulting in a first transmission type adjustment that is different than a second transmission type adjustment indicated by the recommendation.

16. The non-transitory machine-readable medium of claim 13, wherein the operations further comprise:
based on a network load, sending configuration data to the mobile device to configure the mobile device.

17. The non-transitory machine-readable medium of claim 13, wherein the Doppler metric is measured at a first interval, and wherein the Doppler metric is measured at a second interval different than the first interval.

18. The non-transitory machine-readable medium of claim 13, wherein the condition is further associated with a rate of change of channel quality data that has changed from a first rate of change of a channel quality estimate to a second rate of change of the channel quality estimate.

19. The non-transitory machine-readable medium of claim 13, wherein the condition is further associated with a rate of change of a downlink channel estimate that has changed from a first downlink channel estimate to a second downlink channel estimate.

20. The non-transitory machine-readable medium of claim 13, wherein measuring the Doppler metric comprises determining the Doppler metric based on a distance interval of travel associated with the user equipment.

* * * * *

UNITED STATES PATENT AND TRADEMARK OFFICE
CERTIFICATE OF CORRECTION

| | |
|---|---|
| PATENT NO. | : 11,425,590 B2 |
| APPLICATION NO. | : 17/104577 |
| DATED | : August 23, 2022 |
| INVENTOR(S) | : SaiRamesh Nammi and Arunabha Ghosh |

It is certified that error appears in the above-identified patent and that said Letters Patent is hereby corrected as shown below:

On the Title Page

At the assignee item (73), INTETLLECTUAL should be changed to --INTELLECTUAL--.

Signed and Sealed this
Fourth Day of October, 2022

Katherine Kelly Vidal
*Director of the United States Patent and Trademark Office*